United States Patent [19]

Martin

[11] 4,281,842
[45] Aug. 4, 1981

[54] INNER DIAMETER CHUCK

[76] Inventor: Daniel P. Martin, 24068 Meadowbridge, Mount Clemens, Mich. 48043

[21] Appl. No.: 132,399

[22] Filed: Mar. 21, 1980

[51] Int. Cl.³ .............................................. B23B 31/40
[52] U.S. Cl. .............................. 279/2 R; 242/72 R; 269/48.1
[58] Field of Search ............ 279/2 R; 242/46.3, 68.2, 242/72 R; 269/48.1; 82/44

[56] References Cited

U.S. PATENT DOCUMENTS 1,246,130  11/1917  Macready ...................... 242/46.3 X
1,479,253  1/1924   Rivetta ............................ 242/72 X Primary Examiner—Robert D. Baldwin
Attorney, Agent, or Firm—Burton, Parker & Schramm

[57] ABSTRACT

An inner diameter chuck which has a cup shaped holder with a concave face joined by the interior side of the face to a base portion. The holder will flex upon movement of an actuator against the lip of the cup to change the outer diameter along the forward side portions of the cup so to allow for engagement and disengagement of a workpiece.

6 Claims, 3 Drawing Figures

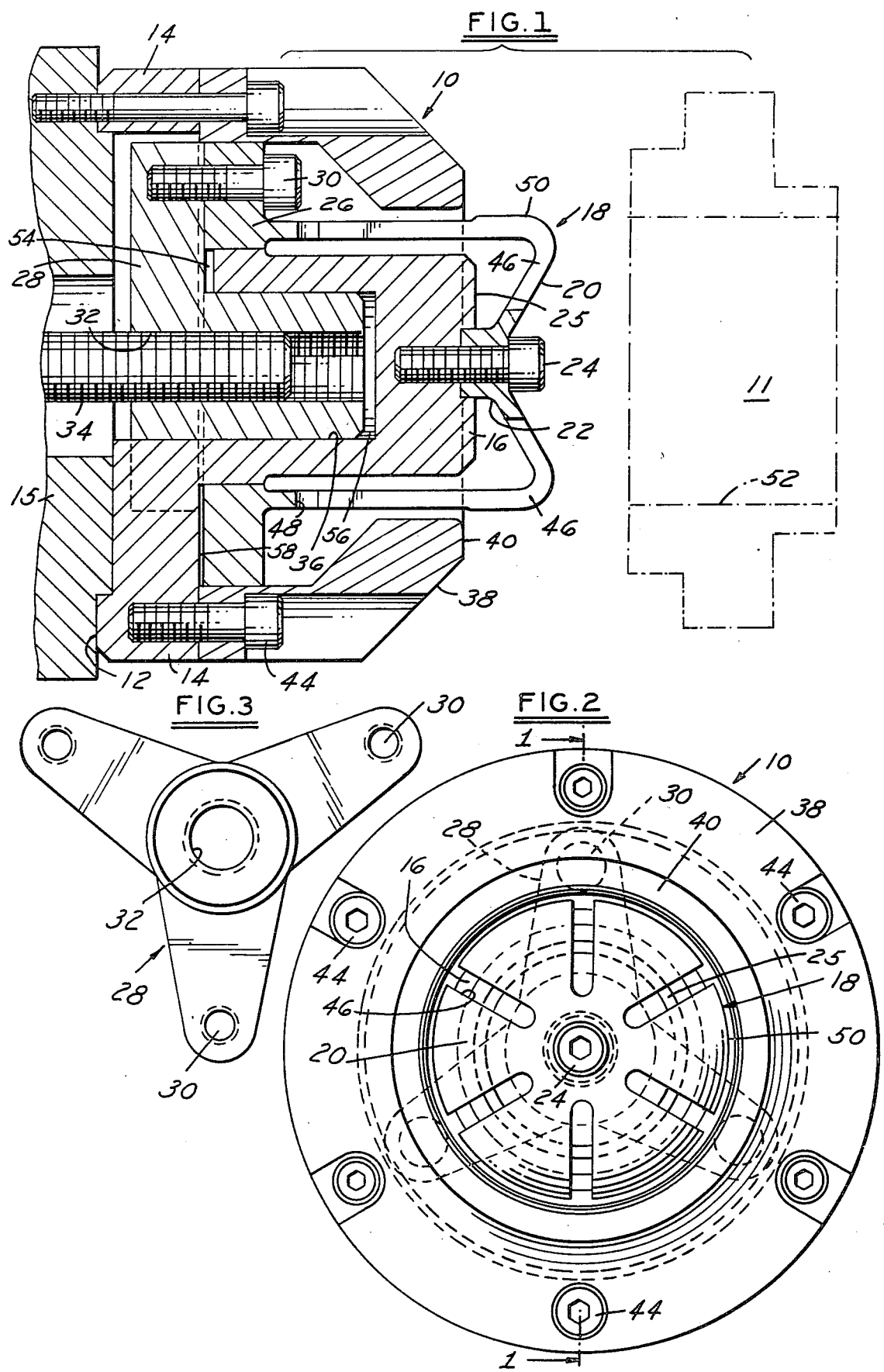

INNER DIAMETER CHUCK

DESCRIPTION

BACKGROUND OF THE INVENTION

This invention relates to a new type of inner diameter chuck, that is, the chuck which holds the workpiece by the inner diameter of a recess in the workpiece. The workpiece holding industry in its efforts to decrease failure of chucks is in search of effective chucks which will hold a workpiece when it is being worked upon yet requires a minimal number of moving pieces which may fail.

SUMMARY OF THE INVENTION

The invention uses a minimal number of moving pieces yet provides a firm hold to the workpiece. In particular, there is an actuator which when moved axially flexes a cup shaped holder so that the outer diameter of a side portion of the holder may be varied. This side portion is engageable with the inner diameter of the recess in the workpiece and the outer diameter may be varied from a diameter greater than the inner diameter of the workpiece recess to a diameter of less than the inner diameter of the workpiece recess. When the diameter is less than the recess's inner diameter, the workpiece may be placed upon or removed from the chuck holder, while at the larger diameter, pressure of the cup against the workpiece will hold it in place.

DESCRIPTION OF THE DRAWINGS

FIG. 1 is a side view of a chuck embodying the invention.

FIG. 2 is a front view of the chuck.

FIG. 3 is a front view of the actuator used in the chuck.

DESCRIPTION OF PREFERRED EMBODIMENTS

Chuck 10 is designed to hold a workpiece 11 such as partially shown in FIG. 1 in phantom outline. The chuck is secured along the rear face 12 of the chuck body 14 by suitable means to a rotary head or spindle 15 of a machine tool. The body has a protruding portion or post 16 over which is mounted workpiece holding means 18 in the form of a cuplike structure having a concave face 20. The interior portion 22 of the concave face is seated in the forward part of the post and rigidly secured thereto by bolt 24. Due to the holder's cuplike shape and concave face, the face will extend in front of the forward face 25 of post 16 a substantial distance before the sides turn back around post. The lip is then positioned around the central post a substantial distance behind the forward face. The face portion of the holder and the forward portions of the side where it will contact the workpiece are of greater thickness than the side areas where no contact will occur. Lip 26 of the cup is joined to actuator 28 by bolt 30 so to enable the cup lip and actuator to move as a unit. The actuator has a central bore 32 into which is screwed a pneumatically controlled rod 34 of the machine tool. This is aligned axially with the post 16 and bolt 24 which holds the cup and the main body together. The actuator is retained within the body 14 by a similarly shaped cavity 36 to prevent rotation with respect to the body. Over the cuplike holder is placed workpiece stop 38 which has a flat forward surface 40 for alignment of the workpiece. The stop is joined to the main body by suitable means such as bolts 44. The workpiece holder has six slots 46 regularly spaced along its sides and face. The slots begin in the concave face adjacent where it is joined to the main body and continue along the sides until they end in stress relieving holes 48 adjacent the lip. The slots are in the same plane as the axis of the central bore 32 and the main body. The slots act to allow the cup to radially expand and contract more easily. Three or more slots will give the best resiliency.

When no workpiece is positioned on the chuck and no force applied to the rod 34, the cuplike holder will taken an unstressed position as shown in FIG. 1 due to the natural resiliency of the cup. The outer diameter of the side portions 50 of the cup where the workpiece will be attached is slightly greater than the inner diameter of the recess 52 of the workpiece. To position the workpiece on the chuck, pin 34 is moved forward which in turn moves actuator 28 and lip 26 forward. To allow for this movement travel space is allowed in body 12 at 54, 56. This causes the holder to flex about the face portion 22 where it is joined to the body. This results in a decreased diameter for the forward side portions 50. When the diameter at 50 is less than the inner diameter of the workpiece, the workpiece is slid over the holder until it abuts stops 38. At this point, the pressure on pin 34 forcing it forward may be released and the holder will spring back towards its initial position so that it engages the workpiece holding it in place. To insure an even firmer grasp of the workpiece, it may be desired to pull pin 34 rearwardly and in turn cause actuator 28 and lip 26 to move backwards. Space is provided for rearward travel of the lip at 58. This flexes the forward side portions 50 outward so that if the workpiece were not present, the outer diameter would increase to even greater than the rest outer diameter. However, with a workpiece in position, this merely results in increased pressure against the inner diameter of notch 52 which increases the forces holding the workpiece to the chuck.

I claim:

1. A chuck for holding a workpiece with an interior recess having an interior diameter comprising a body on which is mounted a radially flexible cup shaped workpiece holder having a concave face interconnected by a side portion to and a lip, the interior of the face rigidly joined to the body; means for connecting the lip to actuator means, the actuator means movable axially with respect to the holder whereby the lip is moved relative to said face interior causing a radial movement of said side portion; an exterior of said side portion of the cup engageable in the recess of the workpiece so to rigidly join the holder to the workpiece, the holder at said side portion having an outer diameter greater than the inner diameter of the workpiece recess when in an unstressed condition with no workpiece present and where movement of the actuator means axially towards said face causes the outer diameter at said side portion to decrease until less than the inner diameter of the workpiece recess.

2. The chuck of claim 1 wherein the actuator means is axially movable away from said face to increase the diameter of said side portion greater than the diameter of said side portion when in an unstressed condition and no workpiece is present.

3. The chuck of claim 1 or 2 wherein the holder has a plurality of longitudinal slots spaced regularly along the face and side portion of the holder.

4. The chuck of claim 3 wherein the holder is flexible about where the face and body are rigidly joined.

5. The chuck of claim 4 further comprising abutment means for positioning the workpiece with respect to the body outside and to the rear of said side portion.

6. The chuck of claim 5 wherein the abutment means comprise a ring surrounding but spaced from the sides of the holder.

* * * * *